United States Patent [19]
Maki et al.

[11] Patent Number: 5,717,459
[45] Date of Patent: Feb. 10, 1998

[54] SOLID STATE IMAGER DEVICE HAVING A/D CONVERTER

[75] Inventors: Yasuhito Maki, Kanagawa; Tetsuro Goto, Chiba; Tadao Takagi, Kanagawa; Hiroyuki Iwasaki, Tokyo, all of Japan

[73] Assignees: Sony Corporation; Nikon Corporation, both of Tokyo, Japan

[21] Appl. No.: 639,733

[22] Filed: Apr. 29, 1996

Related U.S. Application Data

[63] Continuation of Ser. No. 268,572, Jul. 6, 1994, abandoned.

[30] Foreign Application Priority Data

Jul. 8, 1993 [JP] Japan ................. 5-194316

[51] Int. Cl.$^6$ ................................................. H04N 3/14
[52] U.S. Cl. ................................. 348/312; 348/257
[58] Field of Search .................... 348/312, 257, 348/695, 697; 358/531, 538; 341/118, 139; 382/323; H04N 1/46, 3/14

[56] References Cited

U.S. PATENT DOCUMENTS 4,455,574  6/1984  Hashimoto et al. ............. 348/257
5,153,929  10/1992  Itagaki ............................. 382/323
5,296,946  3/1994  Kadowaki et al. ............... 358/531

FOREIGN PATENT DOCUMENTS

A-0 418 918  3/1991  European Pat. Off. ......... H04N 3/15
A-0 438 316  7/1991  European Pat. Off. ......... H04N 1/40

*Primary Examiner*—Andrew Faile
*Assistant Examiner*—Andrew B. Christensen
*Attorney, Agent, or Firm*—Hill, Steadman & Simpson

[57] ABSTRACT

A solid state imager device such as a CCD imager device includes a timing generator which generates and supplies a clamping circuit with, a clamping pulse for clamping a first signal, corresponding to one pixel, from a through region of a CCD shift register, and a clamping pulse for clamping a second signal, corresponding to one pixel, from an optical black region of a sensor array. Specifically, the clamping pulse for clamping the first signal clamps a signal, corresponding to a first pixel, from the through region, and the clamping pulse for clamping the second signal clamps a signal, corresponding to a second or following pixel, from the optical black region. An output signal from the clamping circuit is supplied to an A/D converter which converts the supplied signal at such timing as not to sample the signal, corresponding to the first pixel, from the through region.

8 Claims, 5 Drawing Sheets

SOLID STATE IMAGER DEVICE HAVING A/D CONVERTER

This is a continuation of application Ser. No. 08/268,572 filed Jul. 6, 1994 now abandoned.

BACKGROUND OF THE INVENTION

The present invention relates to a solid state imager device employing a solid state imaging component called an area sensor a linear sensor, and more particularly to a solid state imager device which includes a clamping circuit for clamping an output signal from a solid state imaging component to a reference potential.

Solid state imager devices such as charge-coupled-device (CCD) imagers have a signal processor for sampling and holding signal charges from a charge transfer device and a clamping circuit for clamping sampled and held signals. The clamped signals are then supplied to an analog-to-digital (A/D) converter which converts the signals into digital signals for digital signal processing. Heretofore, a signal voltage higher than the reference potential, generally set to the maximum level of the dynamic range, of the A/D converter is applied to the A/D converter. The application of such a high signal voltage tends to operate the A/D converter in error, break the converted digital data, or break the A/D converter itself.

SUMMARY OF THE INVENTION

It is therefore an object of the present invention to provide a solid state imager device which is capable of detecting a dark level without adversely affecting an A/D converter.

According to the present invention, the above object can be achieved by a solid state imager device comprising: a solid state imaging section including a sensor having a plurality of pixels, the sensor comprising at least linear array of photoelectric transducers representing the pixels, respectively, and a light-shielded region in which pixels are shielded from light, a charge transfer section for transferring signal charges read from the sensor, the charge transfer section having a transfer region for transferring the signal charges and a through region for passing the signal charges therethrough, and a charge detector for detecting signal charges transferred by the charge transfer section, converting the detected signal charges into electric signals, and outputting the electric signals as output signals; a clamping circuit for clamping the output signals from the solid state imaging section; a timing generator for generating a readout gate pulse for reading signal charges from the sensor, a transfer clock signal for energizing the charge transfer section, and clamping pulses for being supplied to the clamping circuit, the clamping pulses including a clamping pulse for clamping a second signal, corresponding to at least one pixel, from the light-shielded region, and a clamping pulse for clamping a first signal, corresponding to at least one pixel, from the through region, and an analog-to-digital converter for converting a clamped output signal from the clamping circuit into a digital signal.

The timing generator may generate a clamping pulse to clamp a signal, corresponding to a first pixel, of the first signal.

The analog-to-digital converter may have such analog-to-digital conversion timing as not to sample the first signal before the clamping signal for clamping the first signal is generated by the timing generator.

The timing generator may generate a clamping pulse to clamp a signal, corresponding to a second or following pixel, of the first signal.

The sensor may comprise a linear sensor composed of a linear array of photoelectric transducers.

The sensor may alternatively comprise an area sensor composed of a two-dimensional matrix of photoelectric transducers.

Each of the photoelectric transducers may comprise a photodiode.

DETAILED DESCRIPTION OF THE PREFERRED EMBODIMENTS

Figure 1:
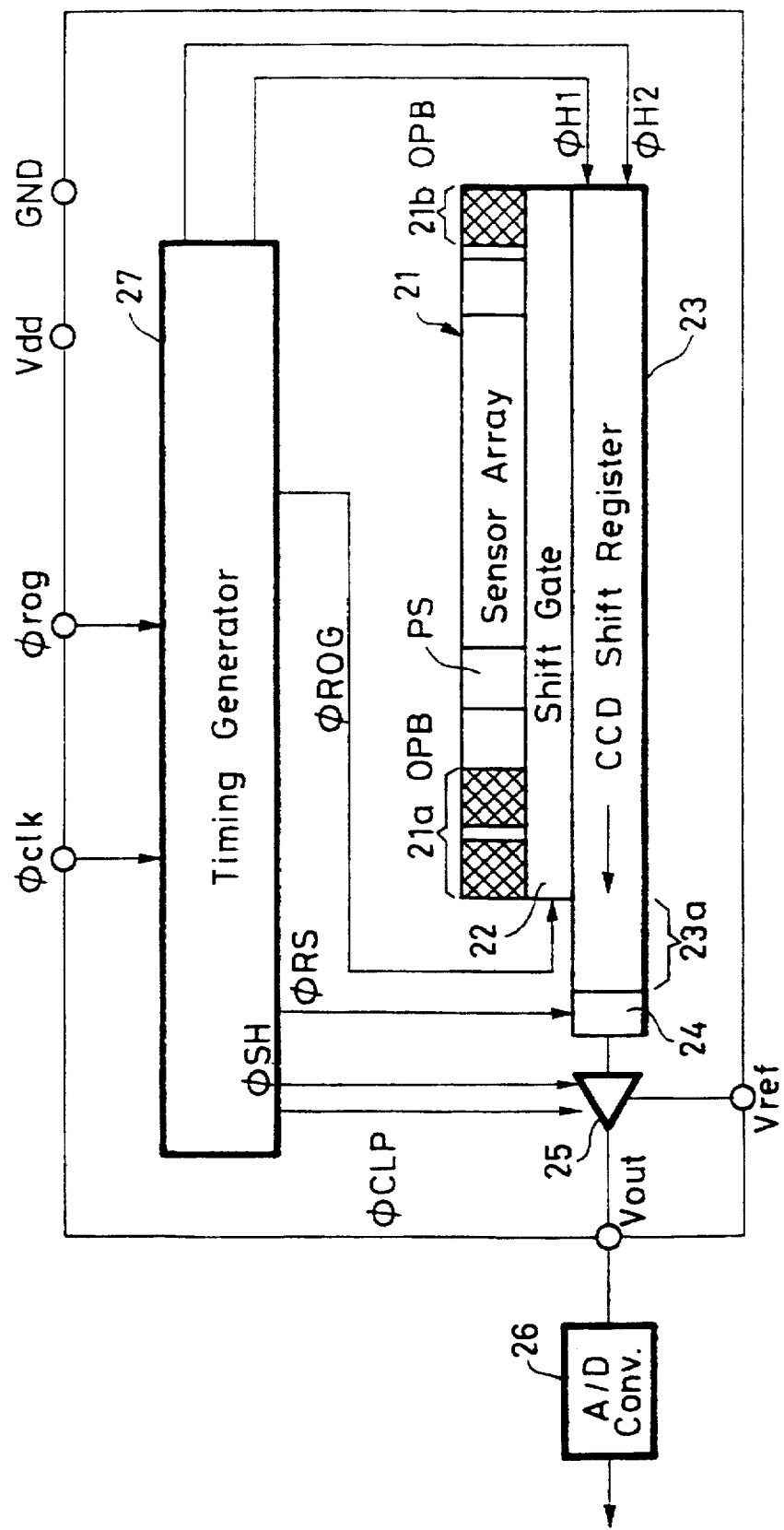
FIG. 1 is a block diagram of a solid state imager device according to an embodiment of the present invention, the a solid state imager device employing a linear sensor.

As shown in FIG. 1, a solid state imager device according to an embodiment of the present invention has a sensor array 21 composed of a linear array of photosensors PS, such as photodiodes, for converting incident light into signal charges which correspond to respective pixels and storing the signal charges. The sensor array 21 includes optical black (OPB) regions 21a, 21b (shown hatched) on its opposite ends where some photosensors PS corresponding to plural pixels are shielded from light, and an imaging pixel region between the OPB regions 21a, 21b.

The signal charges stored by the photosensors PS of the sensor array 21 are read through a shift gate 22 by a charge-coupled-device (CCD) shift register (charge transfer section) 23.

The signal charges thus read are successively transferred in a horizontal direction and supplied to a charge detector 24 by the CCD shift register 23.

The CCD shift register 23 comprises a transfer region corresponding to the photosensors PS, or pixels, of the sensor array 21 for receiving and transferring the signal charges, and a through region 23a disposed between the transfer region and the charge detector 24 for simply passing the signal charges therethrough.

The charge detector 24, which may be of a floating diffusion (FD) arrangement, serves to detect the signal charges transferred by the CCD shift register 23, convert the detected signal charges into signal voltages, and supply the signal voltages to a signal processor 25 connected to the charge detector 24. The signal processor 25 serves to clamp or sample and hold a dark level in order to correct an offset caused by the transmission of light through the CCD shift register 23 or cancel out a dark component. The dark level is the level of pixel signals from the OPB region 21a of the sensor array 21.

Figure 2:
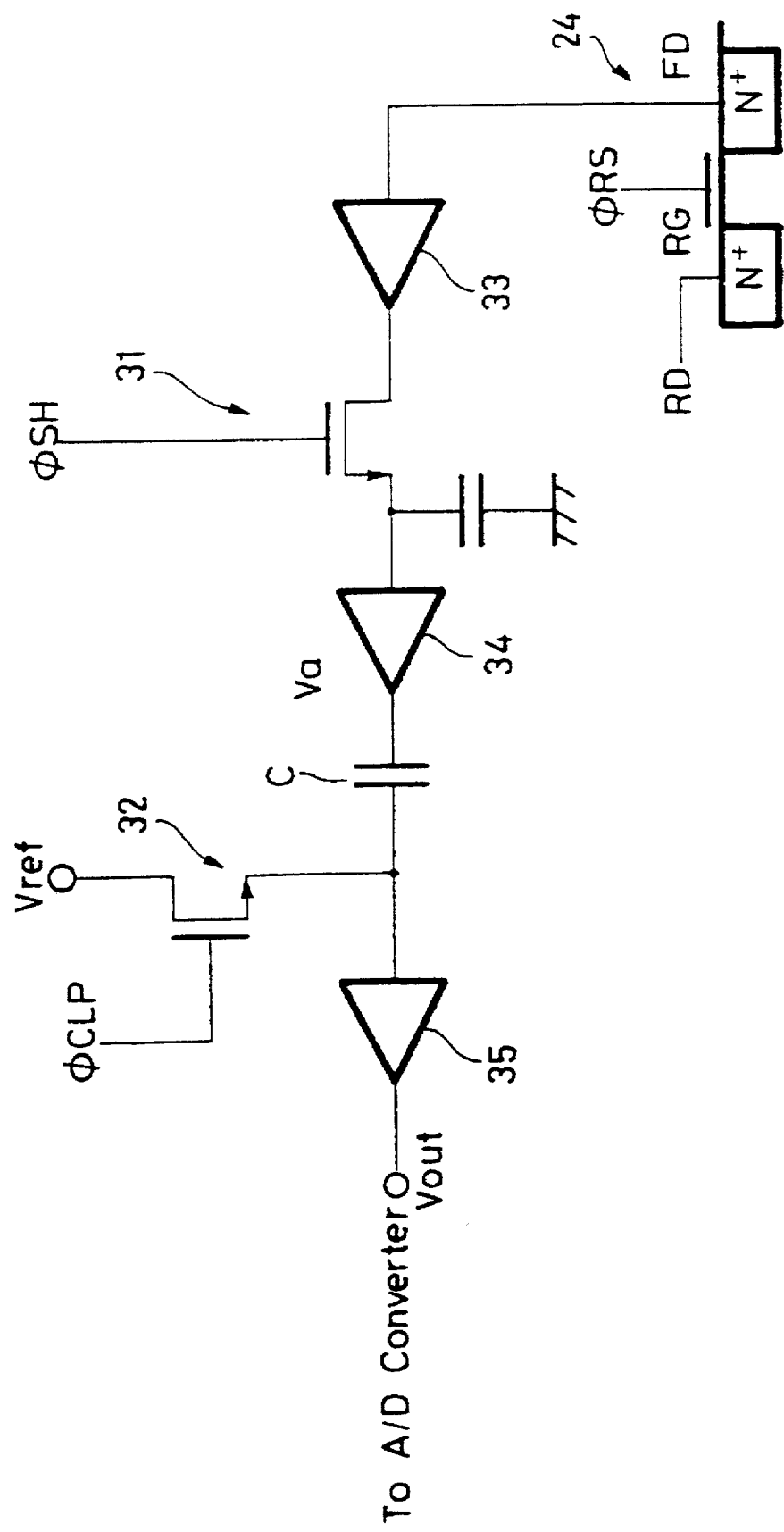
FIG. 2 is a block diagram of a signal processor in the solid state imager device shown in FIG. 1.

The signal processor 25 is specifically illustrated in FIG. 2. The signal processor 25 comprises a sample-and-hold circuit 31 for sampling and holding the signal charges supplied from the charge detector 24 through a buffer 33, and a clamping circuit 32 for clamping an output signal which is supplied from the sample-and-hold circuit 31 through a buffer 34 and an AC coupling capacitor C and supplying the clamped level of the output signal through a buffer 35 as an output signal Vout to an analog-to-digital (A/D) converter 26. The signal processor 25 is fabricated on the same chip as the CCD shift register 23. The A/D converter 26 converts the clamped output signal Vout from the signal processor 25 into a digital signal so that the clamped output signal Vout can subsequently be processed in a digital fashion. The clamping level of the clamping circuit 32 is set to a reference level Vref of the A/D converter 26 to allow the A/D converter 26 to use a wide input dynamic range. Generally, the reference level Vref of the A/D converter 26 is set to the maximum level of the input dynamic range thereof.

In the above embodiment, the clamping circuit 32 is connected in a stage following the sample-and-hold circuit 31 for clamping an output signal from the sample-and-hold circuit 31. However, the clamping circuit 32 may be connected in a stage preceding the sample-and-hold circuit 31 for directly clamping a detected output signal from the charge detector 24.

A timing generator 27 for generating various timing signals is also fabricated on the same chip as the CCD shift register 23.

The timing generator 27 generates, based on a master clock signal φclk and readout gate pulses φrog which are supplied from external sources, a readout gate pulse φROG applied to the shift gate 22 for reading the signal charges from the sensor array 21 into the CCD shift register 23, transfer clock signals φH1, φH2 applied to the CCD shift register 23 for energizing the CCD shift register 23 in a two-phase mode, reset pulses φRS applied to the charge detector 24 to reset the FD arrangement thereof, sample-and-hold pulses φSH applied to the signal processor 25 for enabling the sample-and-hold circuit 31 to sample and hold the signal charges supplied from the charge detector 24, and clamping pulses φCLP applied to the signal processor 25 for enabling the clamping circuit 32 to clamp the output signal from the sample-and-hold circuit 31.

According to the present invention, the clamping pulses φCLP are generated by the timing generator 27 based on the timing which will be described below with reference to FIG. 3.

Figure 3:
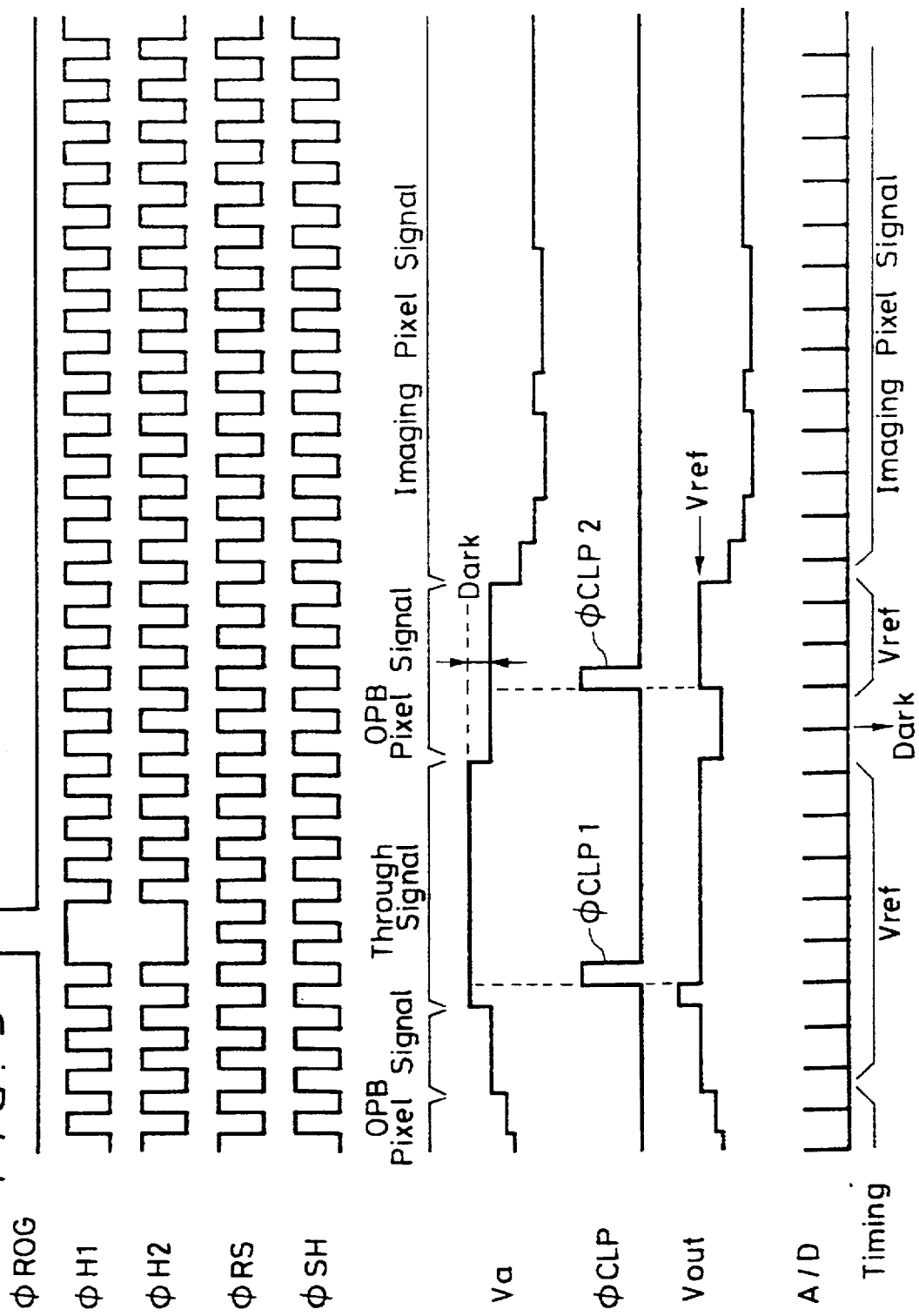
FIG. 3 is a timing chart illustrative of the manner in which the solid state imager device shown in FIG. 1 operates.

FIG. 3 shows a pixel sequence in which the through region 23a corresponds to three pixels, the OPB region 21a to four pixels, the imaging pixel region to 2048 pixels, and the OPB region 21b to two pixels, as counted from the negative-going edge of the readout gate pulse φROG.

The timing chart of FIG. 3 illustrates, in addition to the timing signals φROG, φH1, φH2, φRS, φSH, φCLP, a sampled and held output signal Va from the sample-and-hold circuit 31, the clamped output signal Vout from the clamping circuit 32, and A/D conversion timing pulses of the A/D converter 26.

The timing generator 27 generates a clamping pulse φCLP2 for clamping a signal, corresponding to one pixel, from the OPB region 21a of the sensor array 21, and a clamping pulse φCLP2 for clamping a signal, corresponding to one pixel, from the through region 23a of the CCD register 23.

Specifically, the clamping pulse φCLP1 is generated at such timing as to clamp a signal, corresponding to the first pixel, from the through region 23a, and the clamping pulse φCLP2 is generated at such timing as to clamp a signal, corresponding to the second or following pixel, from the OPB region 21a.

In response to the clamping pulse φCLP1, the clamping circuit 32 clamps the sampled and held output signal Va, corresponding to the first pixel of the through region 23a, from the sample-and-hold circuit 31 to the clamping level Vref. In response to the clamping pulse φCLP2, the clamping circuit 32 clamps the sampled and held output signal Va, corresponding to the second or following pixel of the OPB region 21a, from the sample-and-hold circuit 31 to the clamping level Vref.

Since the clamping circuit 32 clamps not only the sampled and held output signal Va from the OPB 21a, but also the sampled and held output signal Va from the through region 23a, any signal voltage which is higher than the reference potential Vref is applied to the A/D converter 26 for only a short period of time corresponding to the first pixel of the through region 23a.

In the A/D converter 26, the A/D timing pulses are generated based on the master clock signal φclk at such timing as not to sample the sampled and held output signal Va corresponding to the first pixel of the through region 23a.

Therefore, during the period corresponding to the first pixel of the through region 23a, a signal voltage which is higher than the reference potential Vref is applied to the A/D converter 26, but such a high signal voltage is not sampled by the A/D converter 26.

As a result, no signal voltage which is higher than the reference potential Vref is virtually applied to the A/D converter 26, which is thus prevented from operating in error, breaking the converted digital data, or being broken itself.

Because the clamping circuit 32 clamps the sampled and held output signal Va corresponding to the second or following pixel of the OPB region 21a in response to the clamping pulse φCLP2, it is possible to detect the level of a dark area or the like based on the sampled and held output signal Va corresponding to the first pixel of the OPB region 21a.

Figure 4:
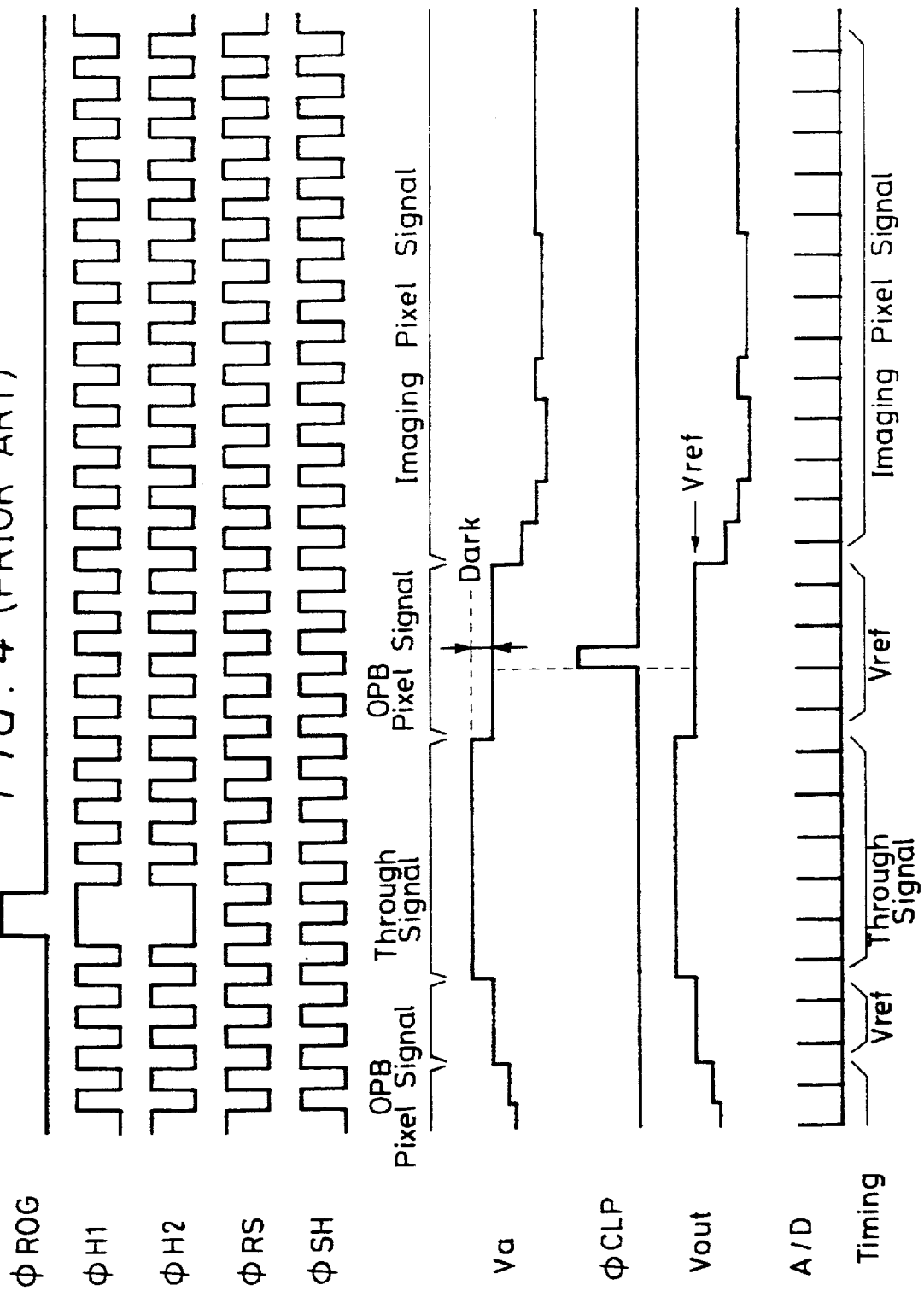
FIG. 4 is a timing chart illustrative of the manner in which a conventional solid state imager device operates.

Heretofore, as shown in FIG. 4, only the pixel signal of the OPB region 21a is clamped to the reference potential Vref of the A/D converter 26 by a clamping pulse φCLP. If the light transmission in the CCD register 23 or the dark component is large, then the signal level of the through region 23a is higher by a dark level than the signal level of the pixel signal of the OPB region 21b. When the output signal Vout produced by clamping the pixel signal of the OPB region 21a to the reference potential Vref of the A/D converter 26 is applied directly to the A/D converter 26, a signal voltage which is higher than the reference potential Vref set to the maximum level of the input dynamic range of the A/D converter 26 is applied to the A/D converter 26. As a consequence, the A/D converter 26 tends to operate in error, break the converted digital data, or be broken itself. One solution would be to clamp the signal from the through region 23a to the reference potential Vref of the A/D converter 26. However, with such a solution, the dynamic range of the A/D converter would be lowered by a dark level, and when a dark level varies due to a temperature change, for example, the imaging pixel signal would also be shifted in level by the dark level, and hence signal processing for subtracting the dark level or the like would have to be required, resulting in a complex circuit arrangement.

Figure 5:
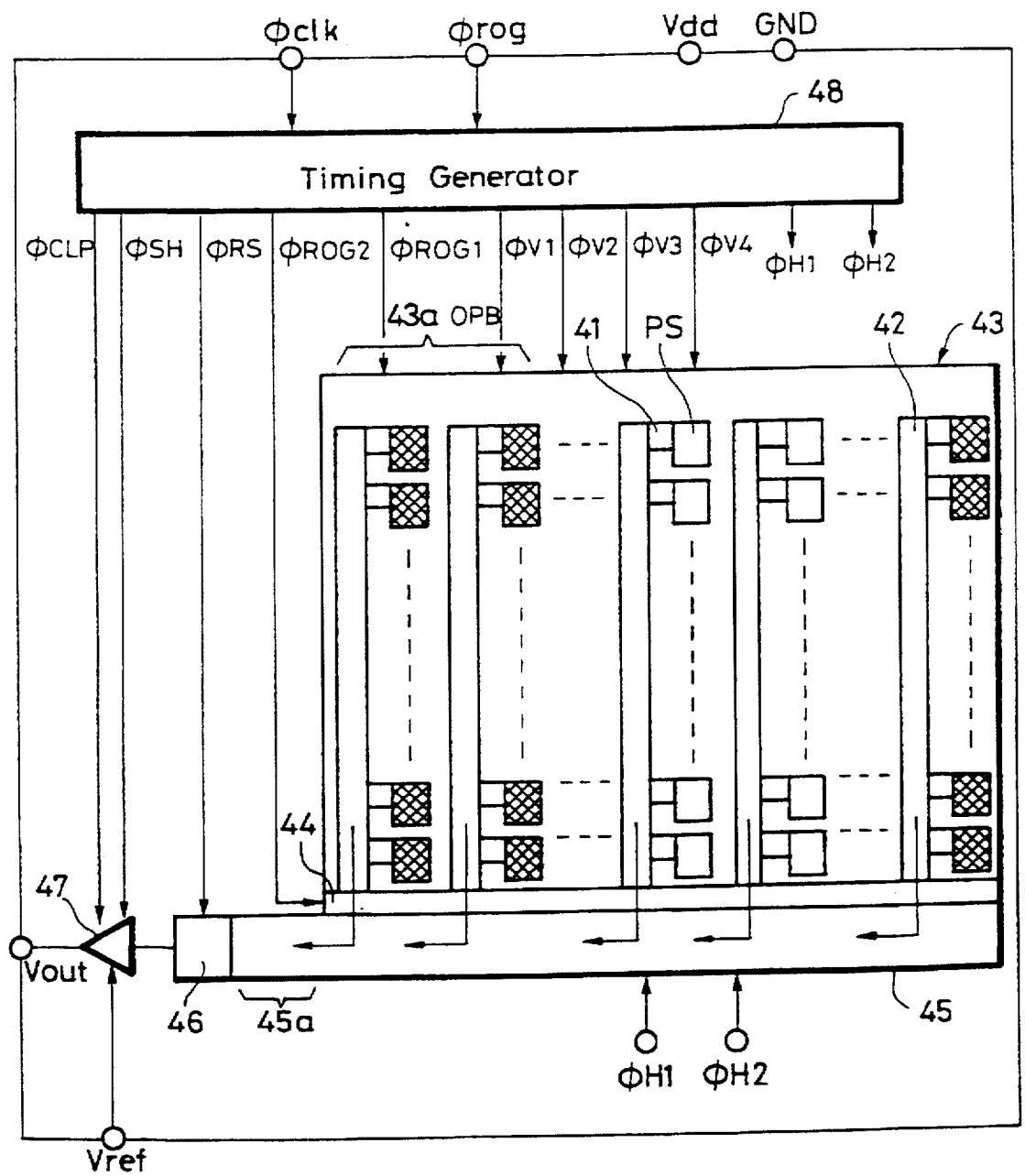
FIG. 5 is a block diagram of a solid state imager device according to another embodiment of the present invention, the a solid state imager device employing an area sensor.

The principles of the present invention are also applicable to a solid state imager device employing an area sensor as shown in FIG. 5.

In FIG. 5, the solid state imager device includes an imaging section 43 composed of a two-dimensional matrix of photosensors PS and a plurality of vertical CCD shift registers 42 associated respective with vertical arrays of photosensors PS for vertically transferring signal charges read from the photosensors PS through readout gates 41.

The imaging section 43 has optical black (OPB) regions 21a, 21b (shown hatched) on its opposite ends where some photosensors PS corresponding to plural arrays of pixels are shielded from light.

Signal charges read into the vertical CCD shift registers 42 are transferred, one scanning line at a time, to a horizontal shift register 45 through a shift gate 44. The signal charges corresponding to one scanning line are successively transferred in a horizontal direction and supplied to a charge detector 46 by the horizontal CCD shift register 45.

The horizontal CCD shift register 45 comprises a transfer region corresponding to the photosensors PS, or pixels, of the imaging section 43 for receiving and transferring the signal charges, and a through region 45a disposed between the transfer region and the charge detector 46 for simply passing the signal charges therethrough.

The charge detector 46, which may be of an FD arrangement, serves to detect the signal charges transferred by the horizontal CCD shift register 45, convert the detected signal charges into signal voltages, and supply the signal voltages to a signal processor 47 connected to the charge detector 46.

The signal processor 47 is of the same circuit arrangement as shown in FIG. 2, and fabricated on the same chip as the CCD shift registers 42, 45.

The solid state imager device shown in FIG. 5 also includes a timing generator 48 for generating various timing signals, the timing generator 48 being also fabricated on the same chip as the CCD shift registers 42, 45.

The timing generator 48 generates, in addition to the reset pulses φRS, the sample-and-hold pulses φSH, and the clamping pulses φCLP, readout gate pulses φROG1 applied to the readout gates 41 for reading the signal charges from the photosensors PS into the vertical CCD shift registers 42, vertical transfer clock signals φV1~φV4 applied to the vertical CCD shift registers 42 for energizing the vertical CCD shift registers 42 in a four-phase mode, a readout gate pulse φROG2 applied to the shift gate 44 for reading the signal charges from the vertical CCD shift registers 42 into the horizontal CCD shift register 45, and horizontal transfer clock signals φH1, φH2 applied to the horizontal CCD shift register 45 for energizing the horizontal CCD shift register 45 in a two-phase mode.

The horizontal CCD shift register 45, the charge detector 46, and the signal processor 47 in the solid state imager device shown in FIG. 5 operate in the same manner as the CCD shift register 23, the charge detector 24, and the signal processor 25 in the solid state imager device shown in FIGS. 1 and 2.

Specifically, the timing generator 48 generates a clamping pulse for clamping a signal, corresponding to one pixel, from the OPB region 43a of the imaging section 43, and a clamping pulse for clamping a signal, corresponding to one pixel, from the through region 45a of the horizontal CCD register 45.

Specifically, the clamping circuit (see FIG. 2) of the signal processor 47 clamps not only a signal from the OPB region 43a, but also a signal from the through region 45a to the reference potential Vref of an A/D converter (not shown in FIG. 5) connected to the signal processor 47, and the A/D conversion timing of the A/D converter is selected so as not to clamp a signal corresponding to the first pixel of the through region 45a. Therefore, though a signal voltage higher than the reference potential Vref of the A/D converter 26 is applied to the A/D converter during the period of the first pixel of the through region 45a, the high signal voltage is not sampled by the A/D converter. Accordingly, the A/D converter is prevented from operating in error, breaking the converted digital data, or being broken itself.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A solid state imager device comprising:
    a solid state imaging section including:
        a sensor having a plurality of pixels, said sensor comprising at least a linear array of photoelectric transducers respectively corresponding to said pixels and a light-shielded region in which at least some of said pixels are shielded from light;
        a charge transfer section for transferring signal charges read from said sensor, said charge transfer section having a transfer region for receiving said signal charges from said sensor and transferring the signal charges and a through region not receiving signal charges from said sensor and for passing the signal charges therethrough; and
        a charge detector electrically coupled to the through region for detecting signal charges transferred by said charge transfer section, converting the detected signal charges into electrical signal and outputting the electric signals as output signals, including a first signal corresponding to signal charges in said through region not read from said sensor and a second signal corresponding to electric signal charges from at least one of said pixels shielded from light;
    an analog-to-digital converter for converting said output signals from said charge detector circuit into digital signals;
    a clamping circuit electrically coupled between said charge detector circuit and said analog-to-digital converter for clamping under the control of separate first and second clamping pulses, each of the output signals from said solid state imaging section, said clamping circuit clamping said first signal under the control of said first clamping pulse and clamping said second signal under the control of said second clamping pulse; and
    a timing generator circuit for generating a readout gate pulse for reading signal charges from said sensor, a transfer clock signal for energizing said charge transfer section, and the first and second clamping pulses for said clamping circuit,
    wherein:
        said analog-to-digital converter has such analog-to-digital conversion timing synchronized with said first clamping pulse so as not to sample said first signal while no first clamping pulse for clamping said first signal is generated by said timing generator.

2. A solid state imager device comprising:
    a solid state imaging section including:
        a sensor having a plurality of pixels, said sensor comprising at least a linear array of photoelectric transducers respectively corresponding to said pixels and a light-shielded region in which at least some of said pixels are shielded from light;

a charge transfer section for transferring signal charges read from said sensor, said charge transfer section having a transfer region for receiving said signal charges from said sensor and transferring the signal charges and a through region not receiving signal charges from said sensor and for passing the signal charges therethrough; and a charge detector electrically coupled to the through region for detecting signal charges transferred by said charge transfer section, converting the detected signal charges into electrical signal and outputting the electric signals as output signals, including a first signal corresponding to signal charges in said through region not read from said sensor and a second signal corresponding to electric signal charges from at least one of said pixels shielded from light;

an analog-to-digital converter for converting said output signals from said charge detector circuit into digital signals;

a clamping circuit electrically coupled between said charge detector circuit and said analog-to-digital converter for clamping under the control of separate first and second clamping pulses, each of the output signals from said solid state imaging section, said clamping circuit clamping said first signal under the control of said first clamping pulse and clamping said second signal under the control of said second clamping pulse; and a timing generator circuit for generating a readout gate pulse for reading signal charges from said sensor, a transfer clock signal for energizing said charge transfer section, and the first and second clamping pulses for said clamping circuit, wherein:
said analog-to-digital converter has such analog-to-digital conversion timing synchronized with said first clamping pulse so as not to sample said first signal while no first clamping pulse for clamping said first signal is generated by said timing generator, said first signal being characterized by different portions related to different pixels and said timing generator circuit comprising means for generating said first clamping pulse to clamp a portion of said first signal corresponding to a second or later pixel of said first signal.

3. A solid state imager device comprising:

a solid state imaging section including:
a sensor having a plurality of pixels, said sensor comprising at least a linear array of photoelectric transducers respectively corresponding to said pixels and a light-shielded region in which at least some of said pixels are shielded from light;

a charge transfer section for transferring signal charges read from said sensor, said charge transfer section having a transfer region for receiving said signal charges from said sensor and transferring the signal charges and a through region not receiving signal charges from said sensor and for passing the signal charges therethrough; and a charge detector electrically coupled to the through region for detecting signal charges transferred by said charge transfer section, converting the detected signal charges into electrical signal and outputting the electric signals as output signals, including a first signal corresponding to signal charges in said through region not read from said sensor and a second signal corresponding to electric signal charges from at least one of said pixels shielded from light;

an analog-to-digital converter for converting said output signals from said charge detector circuit into digital signals;

a clamping circuit electrically coupled between said charge detector circuit and said analog-to-digital converter for clamping under the control of separate first and second clamping pulses, each of the output signals from said solid state imaging section, said clamping circuit clamping said first signal under the control of said first clamping pulse and clamping said second signal under the control of said second clamping pulse; and a timing generator for generating a readout gate pulse for reading signal charges from said sensor, a transfer clock signal for energizing said charge transfer section, and the first and second clamping pulses for said clamping circuit, said first signal being characterized by different portions relating to different pixels of said through region and said timing generator comprising means for generating said first clamping pulse to clamp a portion of said first signal corresponding to a second or following pixel of said first signal, wherein:
said analog-to-digital converter has such analog-to-digital conversion timing synchronized with said first clamping pulse so as not to sample said first signal while no first clamping pulse for clamping said first signal is generated by said timing generator.

4. A solid state imager device according to claim 1, 2 or 3, wherein said clamping circuit clamps said output signals to a reference level that is no greater than a maximum level of an input dynamic range of said analog digital converter.

5. A solid state imager device according to claim 1, 2 or 3, wherein said sensor comprises a linear sensor composed of a linear array of photoelectric transducers.

6. A solid state imager device according to claim 1, 2 or 3, wherein said sensor comprises an area sensor composed of a two-dimensional matrix of photoelectric transducers.

7. A solid state imager device according to claim 1, 2 or 3, wherein each of said photoelectric transducers comprises a photodiode.

8. A solid state imager device comprising:

a solid state imaging section including:
a sensor having a plurality of pixels, said sensor comprising at least a linear array of photoelectric transducers respectively corresponding to said pixels and a light-shielded region in which at least some of said pixels are shielded from light;

a charge transfer section for transferring signal charges read from said sensor, said charge transfer section having a transfer region for receiving said signal charges from said sensor and transferring the signal charges and a through region not receiving signal charges from said sensor and for passing the signal charges therethrough; and a charge detector electrically coupled to the through region for detecting signal charges transferred by said charge transfer section, converting the detected signal charges into electrical signal and outputting the electric signals as output signals, including a first signal corresponding to signal charges in said through region not read from said sensor and a second signal corresponding to electric signal charges from at least one of said pixels shielded from light;

an analog-to-digital converter for converting said output signals from said charge detector circuit into digital signals;

a clamping circuit electrically coupled between said charge detector circuit and said analog-to-digital converter for clamping under the control of separate first and second clamping pulses, each of the output signals from said solid state imaging section, said clamping circuit clamping said first signal under the control of said first clamping pulse and clamping said second signal under the control of said second clamping pulse, said clamping circuit clamping said output signals to a reference level that is no greater than a maximum level of an input dynamic range of said analog-digital converter; and a timing generator circuit for generating a readout gate pulse for reading signal charges from said sensor, a transfer clock signal for energizing said charge transfer section, and the first and second clamping pulses for said clamping circuit, wherein:

said analog-to-digital converter has such analog-to-digital conversion timing synchronized with said first clamping pulse so as not to sample said first signal while no first clamping pulse for clamping said first signal is generated by said timing generator.

* * * * *